June 16, 1959
B. J. NIGRELLI ET AL
2,890,785
CONVEYOR SYSTEM
Filed June 24, 1957
3 Sheets-Sheet 1
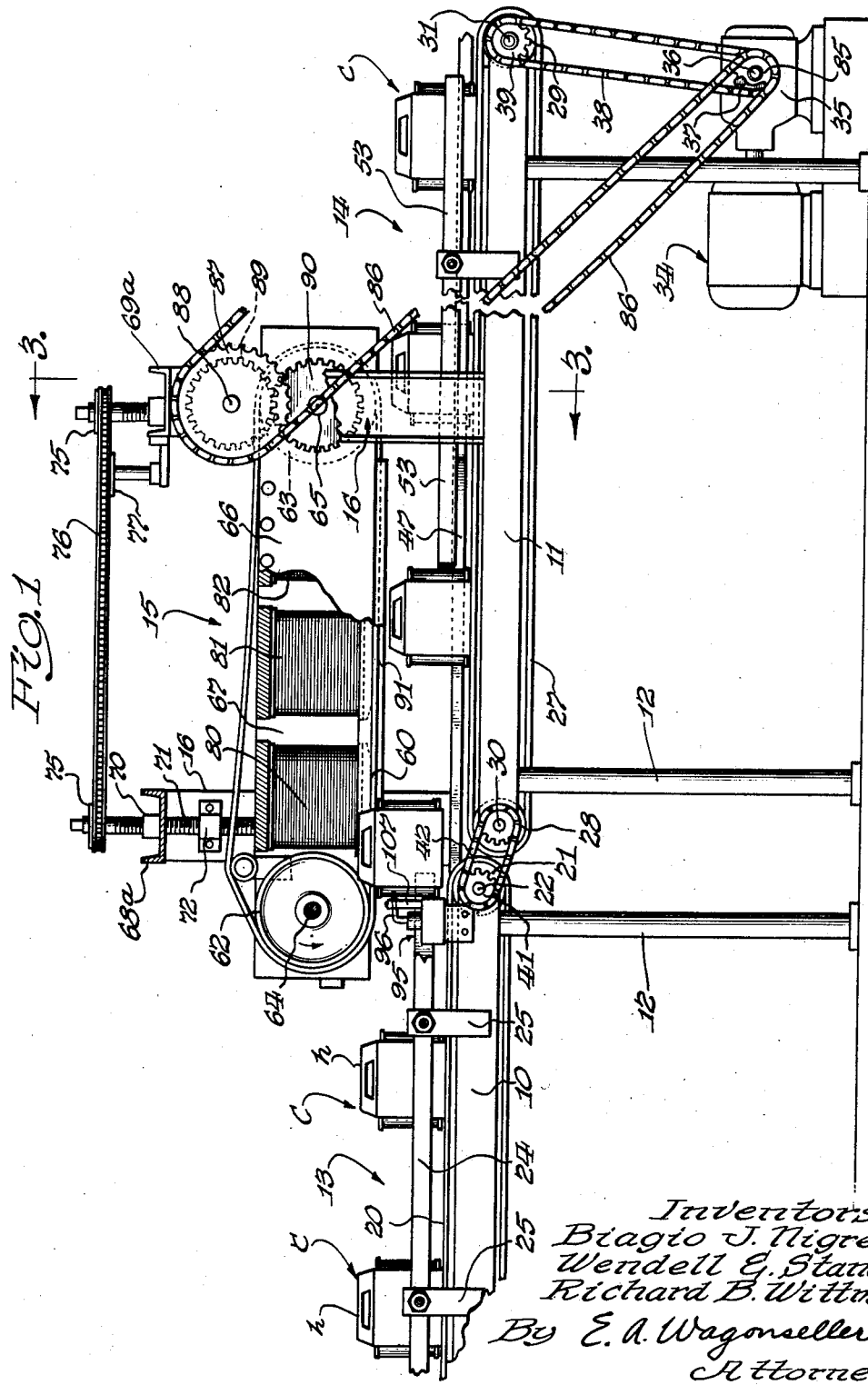
Inventors
Biagio J. Nigrelli
Wendell E. Standley
Richard B. Wittmann
By E. A. Wagonseller
Attorney

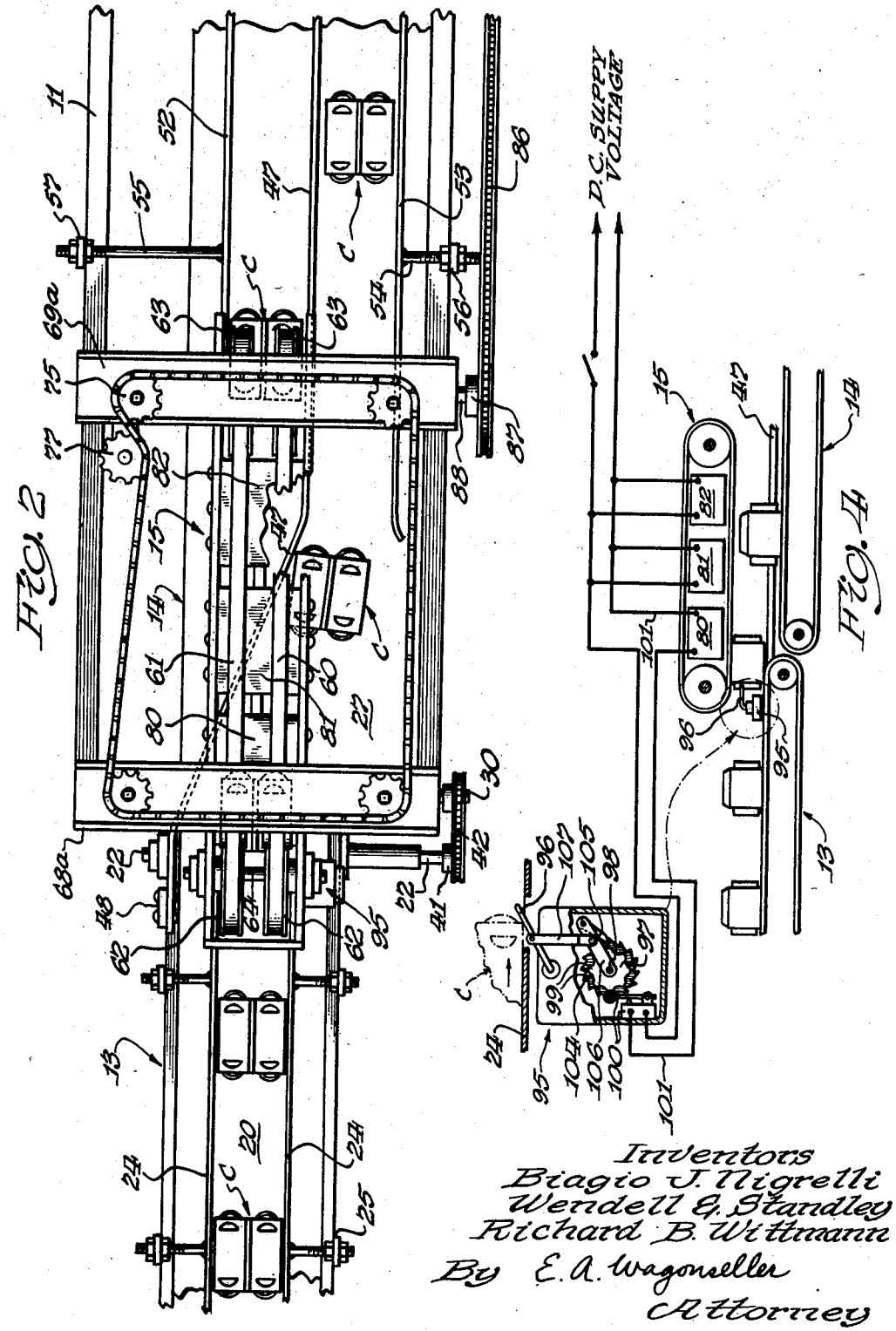

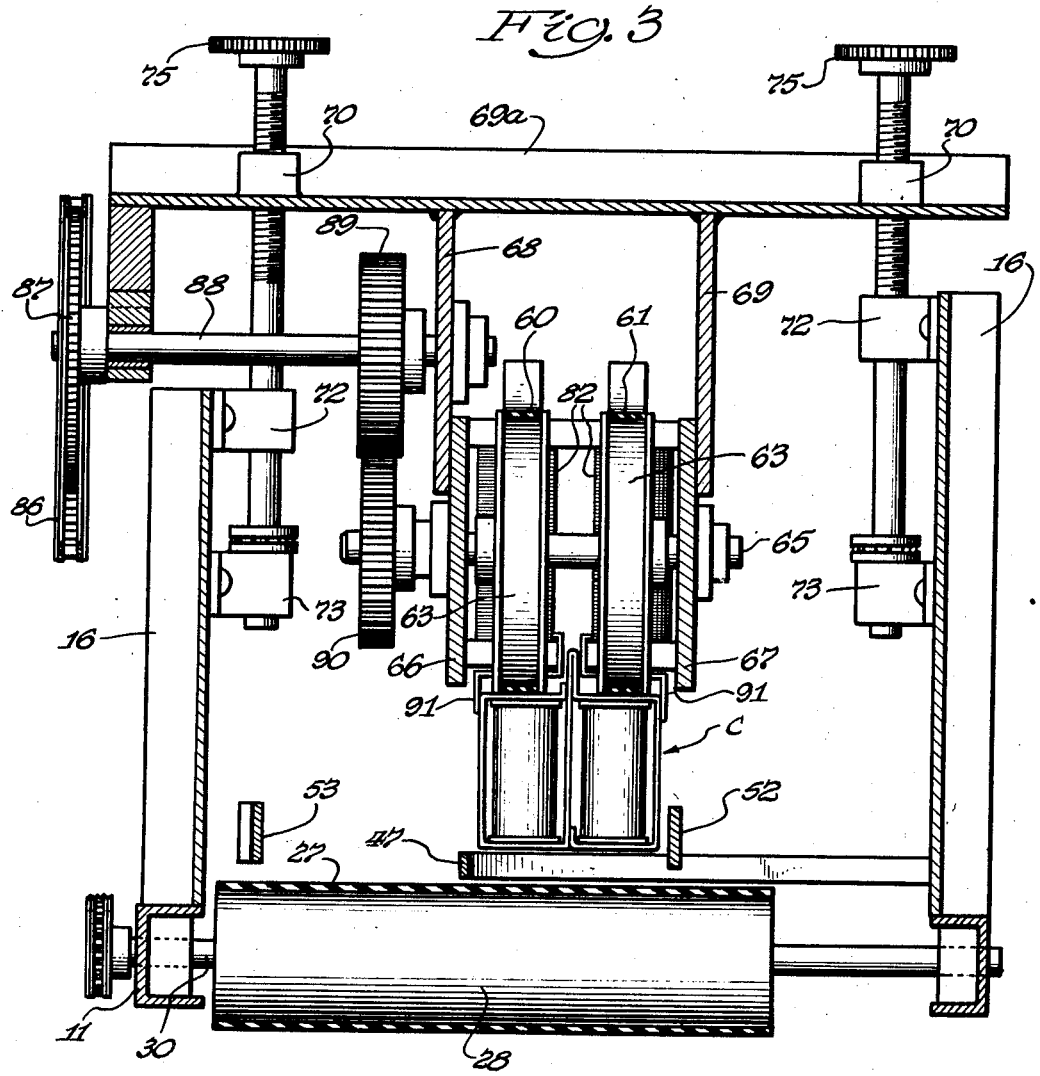

United States Patent Office 2,890,785
Patented June 16, 1959

2,890,785

CONVEYOR SYSTEM

Biagio J. Nigrelli, Northbrook, Wendell E. Standley, Lake Forest, and Richard B. Wittmann, Chicago, Ill., assignors to Ralph W. Johns, Biagio J. Nigrelli, and Robert R. Johns, Chicago, Ill., a copartnership Application June 24, 1957, Serial No. 667,402

7 Claims. (Cl. 198—31)

The present invention relates to conveyor systems for arranging conveyed articles into multiple rows from a single row and more particularly to a conveyor system adapted to handle magnetically permeable articles, such as individual filled tin cans, or packages each comprising a plurality of filled cans.

A principal object of the invention is to provide a simple and effective mechanism with a minimum number of mechanical parts which will separate individual articles moving in a row into two rows by diverting certain articles into a path offset from their original path and cause certain other articles to continue to travel in their original path.

Another object of the invention is to provide mechanism of the type described which will operate smoothly and effectively on a conveyed row of articles following one another in spaced relation to separate the conveyed articles into more than one row.

Additional and more specific objects of the invention will become apparent as the description proceeds.

The mechanism as disclosed herein comprises a primary conveying means for a single row of articles or packages combined with means to deliver the articles or packages onto a secondary conveying means in two separate rows. The secondary conveying means has a section aligned with the primary conveying means and a section offset from the path of the primary. A diverting bar is arranged over the aligned section and extends at an angle to divert articles onto the offset section. An overhead or bridging conveyor is arranged in part over the primary conveying means. This bridging conveyor is designed to carry articles from the primary conveying means over the diverting bar to the aligned section of the secondary conveying means. Means are provided to cause the conveyor intermittently to engage and carry articles whereby two rows of articles will be arranged on the secondary conveying means.

In the drawings illustrating a preferred embodiment of the invention—

Fig. 1 is a side elevation of the mechanism showing the primary conveyor, the secondary or receiving conveyor and bridging conveyor;

Fig. 2 is a plan view of the mechanism shown in Fig. 1, but with an end portion broken away;

Fig. 3 is a sectional view on an enlarged scale, taken along line 3—3 of Fig. 1; and Fig. 4 is a detail, schematic view showing a form of switch mechanism and circuit arranged to energize an electromagnet of the magnetic conveyor intermittently.

The mechanism of the present invention may be employed to advantage as a part of a packaging line to receive loaded cartons of canned beverage from a carton loading machine, from which the packages move in a single line, and subsequently to deliver the packages in two or more lines to machinery adapted to load the packages in shipping cases.

Referring to the drawings, the mechanism as herein disclosed comprises suitable frame members 10 and 11 supported on legs 12, 12. A primary conveyor indicated as a whole at 13 is mounted on frame members 10, a secondary or receiving conveyor 14 is mounted on frame members 11, and a bridging conveyor indicated as a whole at 15 is supported on frame members 16, 16 to extend partly over conveyor 13 and partly over conveyor 14.

The articles to be handled on the present mechanism are illustrated as packages C comprising cartons holding six cans arranged in two rows of three cans each. The cartons may be of any conventional form, either with closed ends or open ends or the groups of cans could be assembled in any other convenient form, such as in paper or plastic bags. In the present instance the cartons employed are illustrated as being of the sleeve type with cans projecting partly from the open ends. The cartons are also shown as provided with upstanding handles h located centrally of the carton and extending lengthwise of the package. This form of carton is disclosed in the U.S. Patent to George H. Parker, No. 2,614,737, issued October 21, 1952.

The primary conveyor 13, shown partly broken away, may be of any suitable form and of any desired length. This conveyor preferably comprises an endless belt 20, passing over rollers, one of which is indicated at 21, mounted on shaft 22 suitably journalled in the frame members 10, 10. The other end of the belt 20 may pass over a similar roller, supported in a similar manner. The intermediate portions of the belt may be supported by closely spaced idler rollers, not shown.

For the purpose of guiding the packages C, C along belt 20 suitable guide bars 24, 24 are provided adjustably supported for in and out movement on upstanding frame elements 25, 25.

The secondary or receiving conveyor 14 shown in Fig. 1 with a section broken out, may be of any suitable construction and any convenient length. This conveyor preferably comprises an endless belt 27 passing over rollers 28 and 29 mounted respectively on shafts 30 and 31 journalled in frame members 11, 11. The belt 27 may be driven from a motor 34 through a reduction gear box 35 having a shaft 36 carrying a sprocket 37. A sprocket chain 38 passes around sprocket 37 and a sprocket 39 fixed on the shaft 31 of the belt roller 29.

For the purpose of driving belt 20 a sprocket 41 is fixed on shaft 22 and a sprocket chain 42 passes around this sprocket and a similar sprocket 43, keyed on shaft 30 upon which conveyor belt roller 28 is fixed. The belt rollers 21 and 28 are preferably of the same size and, likewise, sprockets 41 and 43 are preferably of the same size in order that the two belts 20 and 27 will be caused to travel at the same linear speed.

As best shown in Fig. 2, the receiving conveyor 14 is sufficiently wide to carry two rows of packages and is preferably arranged so that one portion or section is aligned with the primary conveyor 13 and the other section is offset laterally from the line of the primary conveyor. The bridging conveyor 15, to be presently described in detail, provides means for moving packages directly from the conveyor 13 to the aligned section of conveyor 14 and additional means is provided to cause packages to move from conveyor 13 to the offset section of conveyor 14.

For the purpose of moving packages to the offset section of conveyor 14 a diverting rail or bar 47 is arranged closely above the belt 27 and disposed so as to extend angularly across the belt from the outer edge of the section aligned with conveyor 13 to the middle portion of the belt 14, and thence centrally along the belt to serve as a guide rail. One extremity of the rail 47 may be bolted to a frame element 48 and the portion of the bar extending centrally of the belt may be supported from above by suitable bracket members (not shown) located on the main frame of the machine.

Laterally adjustable side guide rails 52 and 53 are provided adjacent the opposite sides of the belt 27 to direct packages along the desired paths on such belt. These rails are welded to threaded rods 54 and 55 respectively which are arranged to be held by nuts in frame elements 56 and 57.

The bridging conveyor 15 may comprise any suitable conveying means for carrying articles or packages from conveyor 13 over the diverting bar 47 and depositing them on conveyor 14. With magnetically permeable packages, such as herein disclosed, it is preferred to attract the packages magnetically against a traveling belt and thus carry them between the primary and receiving conveyors. Additionally, it is preferred to employ electromagnets combined with control means so that the magnetic conveyor may be rendered intermittently effective.

Conveyor 15 in the present instance is formed with two relatively narrow belts 60 and 61 passing over two pairs of pulleys 62, 62 and 63, 63 mounted on shafts 64 and 65 respectively. These shafts are journalled near the opposite ends of frame members 66 and 67 secured to plates 68 and 69 which are in turn secured to laterally extending overhead channel bars 68a and 69a arranged for vertical adjustment with respect to the base frame of the machine so that conveyor 15 may accommodate packages of various heights.

To provide for raising and lowering the channel bars 68a and 69a each bar has an internally threaded boss 70 near each of its ends, receiving threaded shafts 71, 71 rotatably supported, but held from endwise movement, in bearing brackets 72, 72 and 73, 73 attached to upright frame members 16, 16. In order to raise the conveyor carried by the bars 68a and 69a the threaded shafts 71 have fixed thereto near their upper ends sprockets 75, 75, all of the same size, over which pass a sprocket chain 76. A suitable chain tightener sprocket 77 may be employed to keep the sprocket chain properly taut. One or more of the threaded shafts may be formed at its ends to receive a suitable wrench to rotate the shaft, thus causing all the shafts to rotate in unison, which will either raise or lower the conveyor 15 depending upon the direction of rotation.

Suitably secured in between the frame members 66 and 67, and between the belt pulleys 62, 62 at one end and 63, 63 at the other end are several electromagnets. In the present instance three of such magnets are illustrated, indicated at 80, 81 and 82. These magnets are of generally horseshoe shape to present opposite poles downwardly in positions so that each pole will attract a row of cans in a package consisting of two rows. As indicated in Fig. 3, the spacing between the poles of the electromagnets will accommodate the upstanding handles *h* on the packages C. The lower pole faces are preferably aligned with the lower peripheral surfaces of the belt pulleys so that the belts 60 and 61 will move in a straight line between the pulleys and when the magnets are energized a filled package of cans may be carried the entire length of the conveyor 15 by reason of the attraction of the magnets which causes the packages to bear firmly against the undersides of the belts.

The belt pulleys 63, 63 may be driven from the shaft 36 by a sprocket 85 keyed on the shaft over which a sprocket chain 86 passes. This sprocket chain passes over a sprocket 87 keyed on a shaft 88 having fixed thereon a gear 89 meshing with a gear 90 keyed on shaft 65 upon which pulleys 63, 63 are fixed. The relationship of the gearing with the drive for the belts 20 and 27 is preferably such that the belts 60 and 61 of conveyor 15 will travel at approximately the same linear speed as belts 20 and 27.

Thus with the conveyors in motion and the electromagnets suitably energized, a package of filled cans approaching the end of conveyor belt 20 will be picked up by the force exerted by the magnet 80 and held against the lower sides of belts 60 and 61. The package will continue being held against the belts by magnets 81 and 82 until the package reaches a position below pulleys 63, 63 where the package will pass sufficiently out of the magnetic field of magnet 82 so that it will be caused to drop from the belts and will be deposited on the conveyor belt 27. Suitable guides 91, 91 may be provided, supported from the conveyor frame members 67, to retain the packages properly centered while carried by the bridging conveyor.

The diverting bar 47 need have only a relatively small vertical dimension whereby it is adequate to divert packages which are delivered to belt 27 by belt 20 so that the packages are effectively guided to the offset section of belt 27. By properly relating the strength of the magnets to the weight of the packages, the height of the conveyor 15 above the discharge end of conveyor 13 and the vertical dimension of the bar 47, the packages may be picked up when the magnets are energized and the conveyors are operating, such packages may then be carried over the diverting bar 47 and afterward deposited upon the aligned section of conveyor belt 27.

For the purpose of minimizing the force required to be exerted by the magnets it is preferred to so position the conveyors 13 and 14 that belt 27 is on a somewhat lower level than belt 20. See Fig. 1. The position of the magnetic conveyor thus may be adjusted so that the top panels of the packages C will clear the lower surfaces of belts 60 and 61 by only a small space. By so doing the package may be attracted by the magnet 80 and held against the belts by lifting the package only a short distance. In general practice this is not more than approximately one-eighth of an inch. For the purpose of clarity in the drawings the clearance of the bottoms of the packages above the diverting bar 47 is somewhat exaggerated.

The upper surface of the angularly disposed portion of the diverting bar thus is preferably such that it will not extend above the plane of the supporting surface of conveyor 13. By this arrangement it is possible to provide for a force to be exerted by the magnets only sufficient to lift the packages a very small distance. Once a package is lifted by the magnets it will be retained against the belts until the forward travel of the belts forces the package away from the last magnet and it will be caused to drop down upon the conveyor belt 27.

The magnets are energized from a suitable source of direct current and means is provided to control the magnetic conveyor for intermittent operation. It is not required, however, that any except the magnet 80 be intermittently controlled. The magnets 81 and 82 may be retained constantly energized while the machine is in operation providing that their attractive force is not sufficient to lift a package up against the belts 60 and 61 and accidentally carry the package over the diverting bar.

It is within the scope of the invention to control the magnetic conveyor manually, but preferably the conveyor is actuated by means responsive to packages moving to their discharge point on conveyor 13. It is preferred to operate and control the magnetic conveyor so that, while its belts are in constant operation, each alternate package discharged from conveyor 13 will be engaged and carried over the diverting bar 47 while the remainder are not engaged by the magnetic conveyor. These latter will move directly onto belt 27 and against the bar 47 and by it they will be diverted or shunted to travel on the offset section of the belt 27.

Any suitable on-and-off or "flip-flop" type of switch actuating mechanism may be employed, such as a mechanical switch, actuated by physical engagement of the package with a trip element; a proximity switch element could be employed or the switch may be actuated by the interruption or reestablishment of a light beam of a photoelectric cell unit. In the present instance there is disclosed a mechanical switch control mechanism the housing for which is indicated at 95, located on the frame of the machine near the discharge end of conveyor 13. A trip finger 96 is mounted to have a deflectable end portion yieldingly mounted so as normally to project into the package path. Thus each package, moving to the discharge point of conveyor 13, will engage the end of the trip finger and deflect it outwardly until the package has passed the finger after which it will again move into the package path ready to be engaged by a succeeding package. Within the housing 95 is located a cam element 97 mounted for rotation on a spindle 98 and having a plurality of separated cam surfaces 99, 99 each of which is adapted to actuate a cam follower switch lever 100 to open and close a switch in conductor 101 connected with a suitable source of D.C. voltage and with the coils 102, 103 of electromagnet 80. A ratchet wheel 104 is fixed to the cam 97 and is arranged to be rotated step-by-step by a spring loaded detent 105 carried on arm 106. A link 107 connects the arm 106 and trip finger 96. By this arrangement a passing package moves the trip finger causing the detent to rotate the ratchet and cam attached thereto the angular distance of the length of one of the ratchet teeth. At one position the cam surface will move the cam follower switch lever to a position in which the switch is closed and in the next position of the ratchet wheel the cam follower will remain between the high cam surfaces, and the switch will be in open position until a new high cam surface is brought into contact with the follower. While the construction of the switch actuating device is such that every other package will be engaged by the bridging conveyor, it is within the scope of the invention to cause any predetermined number of packages to be carried over the deflecting bar and to allow any predetermined number of packages to move against and be diverted by the diverting bar. In order to divert two or more packages successively it is only necessary to select a cam element 97 with increased angular distances between the high cam surfaces. Similarly, by increasing the angular lengths of the high cam surfaces, for example, so that the cam follower will be engaged thereon while two ratchet teeth are being engaged by the detent, the electromagnetic switch will remain closed to cause two packages to be carried over the diverting bar by the bridging conveyor.

From the foregoing it is apparent that there is provided a conveyor system of a relatively simple form for converting a row of conveyed articles into two rows. By utilizing an overhead bridging conveyor to carry packages over the diverting bar the need for movable switching members is eliminated. The separation of the conveyed row into two rows may be effected with speed and accuracy and with a minimum number of parts subject to wear and requiring renewal or replacement. If it should be desired to make a further separation of the separated rows this may be done by using additional units formed as described herein.

Although it is preferred, for the sake of economy, to utilize a narrow primary conveyor with a receiving conveyor of a width to accommodate two rows it is obvious that the primary conveyor could also be made wider, or the primary and secondary conveying means could be constituted as parts of the same conveying means.

While the foregoing description sets forth a preferred embodiment of the invention it is apparent that numerous changes may be made in the mechanism described without departing from the spirit of the invention, and it is desired that the present embodiment be considered in all respects as illustrative rather than restrictive, reference being had to the appended claims rather than to the foregoing description to indicate the scope of the invention.

What is claimed is:

1. A conveyor system for arranging a single row of conveyed articles into two rows, comprising, in combination, a primary conveyor adapted to convey a single row of articles of uniform character and condition, a receiving conveyor having a width sufficient for two rows of articles and positioned to receive articles from the primary conveyor, a diverting bar arranged over and in closely spaced relation to the receiving conveyor with an end terminating medially of the sides of the receiving conveyor, whereby articles may be diverted to travel along one edge portion of the conveyor, and selectively operable means acting individually upon the articles for carrying a portion of the articles from the primary conveyor, over the diverting bar and depositing them on the receiving conveyor beyond the diverting bar, whereby the articles will be carried along the other edge portion of the receiving conveyor.

2. A conveyor system for arranging a single row of conveyed articles into two rows, comprising, in combination, a primary conveyor adapted to convey a single row of articles, a receiving conveyor having a section aligned with the primary conveyor and a section offset, whereby it is sufficiently wide to convey two rows of articles, a diverting bar supported above the conveying surface of the receiving conveyor independently of such conveyor and extending at an angle across the section of the receiving conveyor that is aligned with the primary conveyor, said bar terminating between the aligned section and the offset section of the receiving conveyor, a bridging conveyor disposed above the primary and receiving conveyors effective to carry articles from the primary conveyor over the diverting bar to the aligned section of the receiving conveyor, and means responsive to the passage of articles along said conveyors for operating the bridging conveyor intermittently whereby a portion of the conveyed articles will be delivered to the aligned section and the remainder of the conveyed articles will be conveyed into contact with the diverting bar and will be moved forwardly and laterally onto the offset section.

3. A conveyor system for arranging a single row of magnetically permeable articles into two rows, comprising in combination, a primary conveyor adapted to convey a single row of such articles, a receiving conveyor having a section aligned with the primary conveyor and a section offset, whereby it is sufficiently wide to convey two rows of articles, a diverting bar supported closely above the conveying surface of the receiving conveyor independently of such conveyor and extending angularly across the section of the receiving conveyor that is aligned with the primary conveyor, said bar terminating between the aligned section and the offset section of the receiving conveyor, a magnetic conveyor arranged above the primary conveyor and the aligned section of the receiving conveyor, said magnetic conveyor extending over the angularly disposed diverting bar, the height of the conveying surface of the magnetic conveyor above the primary conveyor and the angularly disposed diverting bar being slightly greater than the height of the articles to be conveyed whereby an article engaged and carried by the magnetic conveyor may pass from the primary conveyor over the angularly disposed diverting bar and may be deposited on the aligned section of the receiving conveyor, and means for rendering the magnetic conveyor effective at intervals, whereby a portion of the articles may be carried over the diverting bar and be deposited on the aligned section of the receiving conveyor.

4. A conveyor system as defined in claim 3, wherein the magnetic conveyor comprises an electro-magnet and wherein selective switch means is located along the path of the conveyed articles, actuable by the passage of packages to energize and deenergize the electro-magnet intermittently.

5. A conveyor system for arranging a single row of conveyed packages comprising magnetically permeable articles into two rows, comprising, in combination, a primary conveyor adapted to convey a single row of packages of such articles, a receiving conveyor having a section aligned with the primary conveyor and a section offset, whereby it is sufficiently wide to convey two rows of packages, a diverting bar supported above the conveying surface of the receiving conveyor independently of such conveyor and extending angularly across the section of the receiving conveyor that is aligned with the primary conveyor, said bar terminating between the aligned section and the offset section of the receiving conveyor, the receiving conveyor having its end which is adjacent the discharge end of the primary conveyor disposed somewhat lower than such discharge end, the effective height of the diverting bar above the receiving conveyor being slightly less than the difference in height between the primary and receiving conveyors, a magnetic conveyor arranged above the primary conveyor and the aligned section of the receiving conveyor, said magnetic conveyor extending over the angularly disposed diverting bar, the height of the conveying surface of the magnetic conveyor above the primary conveyor being slightly greater than the height of the packages to be conveyed, whereby a package engaged and carried by the magnetic conveyor may pass from the primary conveyor over the angularly disposed diverting bar and may be deposited on the aligned section of the receiving conveyor, and means for rendering the magnetic conveyor effective at intervals, whereby a portion of the packages will be carried over the diverting bar and be deposited on the aligned section of the receiving conveyor.

6. A conveyor system as defined in claim 5, wherein the magnetic conveyor comprises an electro-magnet and wherein selective switch means is located along the path of the conveyed packages and actuable after a predetermined number of packages has passed the switch means to energize the electro-magnet to cause certain packages to be carried over the diverting bar and be deposited on the aligned section of the receiving conveyor.

7. A conveyor system for arranging a single row of conveyed articles into two rows, comprising in combination, a primary conveyor adapted to convey a single row of articles of uniform character and condition, a receiving conveyor having a width sufficient for two rows of articles and positioned to receive articles from the primary conveyor, an angularly disposed diverting bar arranged over and in closely spaced relation to the receiving conveyor with an end terminating medially of the sides of the receiving conveyor, whereby articles delivered to the receiving conveyor may be diverted to travel along one edge portion of the conveyor, an overhead bridging conveyor disposed above and extending in the direction of travel of the primary and receiving conveyors and adapted to engage individually and carry articles from the primary conveyor over the angularly disposed diverting bar to the receiving conveyor, and means for selectively rendering the bridging conveyor operative and inoperative, the discharge point of the primary conveyor being spaced above the receiving conveyor a distance slightly greater than the distance of the upper surface of the diverting bar from the receiving conveyor, whereby articles engaged by the bridging conveyor will be carried over the diverting bar in a path substantially coplanar with the discharge end of the primary conveyor.

References Cited in the file of this patent

UNITED STATES PATENTS

| | | |
|---|---|---|
| 1,612,893 | Thompson | Jan. 4, 1927 |
| 2,745,548 | Schroeder | May 15, 1956 |